United States Patent [19]

Gibbons et al.

[11] Patent Number: 4,698,246

[45] Date of Patent: Oct. 6, 1987

[54] NOVEL LAMINATES FOR PAPERBOARD CARTONS AND A PROCESS OF FORMING SAID LAMINATES

[75] Inventors: Charles E. Gibbons; Allan A. Whillock; Robert L. Lanham; Joe L. Kinsey, Jr., all of Mobile, Ala.

[73] Assignee: International Paper Company, New York, N.Y.

[21] Appl. No.: 836,286

[22] Filed: Mar. 5, 1986

[51] Int. Cl.⁴ .................... B65D 15/22; B32B 27/00
[52] U.S. Cl. ................................ 428/35; 428/349; 428/458; 428/480; 428/483; 428/511; 427/39; 427/224; 427/411; 426/127
[58] Field of Search .......... 428/481, 511, 537.5, 428/35, 483, 516, 461, 349, 480, 458; 426/127; 427/39, 224, 411

[56] References Cited

U.S. PATENT DOCUMENTS

| | | | |
|---|---|---|---|
| 3,018,189 | 1/1962 | Traver | 428/516 |
| 3,081,214 | 3/1963 | Strome | 156/273.3 |
| 3,397,101 | 8/1968 | Rausing | 156/229 |
| 3,904,104 | 9/1975 | Kane | 428/481 |
| 3,927,244 | 12/1975 | Ogura et al. | 428/483 |
| 3,939,025 | 2/1976 | Kane | 428/481 |
| 3,972,467 | 8/1976 | Whillock et al. | 428/511 |
| 3,976,528 | 8/1976 | James | 428/336 |
| 4,011,358 | 3/1977 | Roelofs | 428/511 |
| 4,373,002 | 2/1983 | Petersen-Hoj | 428/213 |
| 4,405,400 | 9/1983 | Petersen-Hoj | 428/213 |
| 4,468,426 | 8/1984 | Hatchadoorian et al. | 428/213 |
| 4,474,918 | 10/1984 | Seymour et al. | 524/324 |
| 4,512,838 | 4/1985 | Rausing | 156/203 |
| 4,512,948 | 4/1985 | Jabarin | 264/521 |
| 4,513,036 | 4/1985 | Thompson et al. | 428/35 |
| 4,590,126 | 5/1986 | Andersson | 428/511 |
| 4,559,257 | 12/1985 | Nilsson | 428/35 |
| 4,571,340 | 2/1986 | Ferrante et al. | 426/128 |

OTHER PUBLICATIONS

New Applications for Co-Polyester, Nov. 1984, pp. 4-5, Beverage Industry.

Primary Examiner—John E. Kittle
Assistant Examiner—James J. Seidleck
Attorney, Agent, or Firm—Walt T. Zielinski; Stewart L. Gitler

[57] ABSTRACT

The present invention relates to an improved container for citrus juices and other liquids. The container utilizes a paperboard barrier laminate for the containment of essential oils and the prevention of losses of Vitamin C. Also disclosed is a process of making the laminate. The laminate makes use of a layer of a heat-sealable glycol-modified polyethylene terephthalate to enhance the barrier properties of the laminate.

22 Claims, 10 Drawing Figures

EXISTING COMMERCIAL STRUCTURES

CHAMPION PATENT

NOVEL LAMINATES FOR PAPERBOARD CARTONS AND A PROCESS OF FORMING SAID LAMINATES

BACKGROUND OF THE INVENTION

The invention relates to heat-sealable barrier laminates for the containment of essential oils and the prevention of loss of Vitamin C in paperboard cartons, as well as to a process for making such laminates. More particularly, this invention relates to barrier laminates which are comprised of an improved heat-sealable product contact material which does not absorb or transmit flavor or odor ingredients of citrus and other juices.

Heat-sealable low-density polyethylenes are well known to be components of current paperboard citrus juice cartons which provide no barrier to absorption and/or transmission of citrus juice essential flavor-/aroma oils. Additionally, it is well known that impermeable materials such as aluminum foil, polar materials such as: polyamides, polyethylene terphthalates, polyvinylidene chlorides, polyvinyl chlorides, etc., and highly crystalline non-polar materials such as high-density polyethylene and polypropylene provide varying degrees of barrier to the absorption and/or transmission of non-polar citrus juice flavor oils such as d-limonene, et al. However, these materials could not be substituted for low density polyethylene since they lacked the requisite heat sealability over a practical temperature range, necessary FDA clearance for direct contact to foods stress cracking resistance and cutability during the scoring, and/or die cutting conversion processes. Due to the failures of these impermeable materials, past efforts have concentrated on using a combination of these flavor oil resistant materials with low density polyethylene as the heat-sealable component.

The existing commercial structure for a paperboard carton for juice and similar products has utilized an easily heat-sealable barrier laminate composed of paperboard sandwiched between two layers of low density polyethylene (LDPE). The LDPE is an inexpensive heat-sealable moisture barrier to prevent loss of essential oils and flavors. The conventional structure falters in that the LDPE layer absorbs the essential oils of the juice after short periods of time causing integrity decay of heat seals and stress cracking of the layer. Additionally, the conventional structure provides virtually no barrier resistance to oxygen causing the juice to lose Vitamin C in large amounts.

One other conventional structure adds two additional layers to the structure identified above, namely a foil layer and an additional LDPE layer. The expensive foil layer increases barrier resistance to the flow of oxygen, while the additional LDPE allows for ultimate heat-sealability of the laminate. The improved conventional structure has poor barrier properties relating to the absorption of essential oils and aromas, since the interior contacting layer is still LDPE.

The object of the present invention is to produce an improved juice packaging heat-sealable laminate material which does not absorb or transmit flavor/odor ingredients of citrus and other juices.

SUMMARY OF THE INVENTION

The preferred embodiment of the present invention reveals a heat-sealable barrier laminate providing a substantial barrier to the loss of Vitamin C and an almost complete barrier to the loss of essential flavor oils over the shelf life period of the carton and far beyond the six week period as well. The preferred embodiment comprises from the outer surface to the inner surface contacting the essential oils and/or flavors: an exterior layer of a low density polyethylene, a paperboard substrate, an interior layer of a low density polyethylene and a layer of a glycol-modified polyethylene terephthalate (PETG) coated onto the interior layer of the low density polyethylene, in contact with the juice rendering the laminate heat sealable.

The cartons constructed of the laminate of the present invention enable significant flavor oil retention of the citrus juice contained, and also significant prevention of loss of Vitamin C, resulting in a significant extension of the shelf life thereof and permits replacement of the costly aluminum foil barrier.

The preferred PETG, Kodak Kodabond Copolyester 5116 is available from Eastman Chemical Products, Inc., Kingsport, Tenn.

The present invention has produced a suitable container which has excellent barrier properties utilizing a laminate which can be heat-sealed with its exterior and interior layers being a non-polar (LDPE) and a polar (PETG) from front to back. The conventional theories have been that the laminate could not be heat-sealed on conventional apparatus at practical temperatures without having non-polar constituents on its ends. The liquid juice components are insoluble in the polar PETG material, preventing flavor oil absorption and resulting swelling, stress cracking, and plasticization, heat seal degradation as occurs with LDPE as the contact layer.

The preferred laminate of the present invention not only exhibits significant barrier properties to extend the shelf life of the juice, but the laminate is produced using conventional extrusion equipment.

Stepwise, a layer of molten LDPE is placed onto the paperboard substrate by extrusion coating, the newly formed layer of LDPE is then corona discharge treated or flame treated in preparation for heat-sealing later in the process.

Secondly, the web is flipped over down-line and a layer of LDPE is extrusion coated onto the other an exposed side of the paperboard substrate. This layer is also corona discharge treated or flame treated to facilitate adhesion to subsequent PETG layer.

Thirdly, a molten layer of PETG is extrusion coated onto the interior layer of LDPE. The completed laminate can now be heat-sealed from front to back (LDPE to PETG) at conventional temperatures (250° F. to 500° F.).

The newly formed laminate can then be scored, cut into blanks, folded and side-seam heat-sealed thereon for transport.

Once transported, the prepared blanks can be placed onto conventional equipment, such as a PurePak ® machine made by Ex-Cell-O. The blanks are heat-sealed at the bottom, filled and heat-sealed at the top by the PurePak ® machine to complete the filled carton.

The barrier laminate produced by the present invention not only exhibits excellent barrier properties and can be easily constructed but also meets FDA approval for use in food packaging. Kodak's Copolyester 5116 is FDA approved for direct food contact and the preferred PETG of the invention. Other PETG's which heat seal at low temperatures (250° F. to 500° F.) and which can be cut on conventional machinery could also be used as the contacting barrier.

Thus, until the advent of the present invention no suitable containers for the containment of citrus juices have been developed which retain the advantages of using paperboard as the base material and is an FDA approved heat-sealable barrier laminate which is economical and can be formed using conventional extrusion coating equipment.

The present invention described herein is particularly useful as a paperboard laminate employed in the manufacture of citrus juice or other liquid containers. Such containers which make use of a heat-seal for seaming and closing such as folding boxes, square or rectangular containers or cartons, or even cylindrical tubes.

DETAILED DESCRIPTION OF THE INVENTION

The existing commercial structure for a paperboard carton for juice and similar products has made use of an easily heat-sealed barrier laminate composed of paperboard 4 (FIG. 1) sandwiched between two layers of low density polyethylene (LDPE) 2, 6. The LDPE is an inexpensive heat-sealable material which acts only to a limted extent as a moisture barrier to prevent loss of essential oils (flavor) and aroma. The problem encountered with conventional laminate structure has been that the essential oils of the juice (namely - D Limonene) has, after short periods of time, been absorbed into the LDPE layer causing heat seal decay, stres cracking, and swelling while stripping the juice of the essential oils. Additionally, the conventional structure (FIG. 1) provides virtually no barrier resistance to oxygen which causes the juice to lose Vitamin C in great quantities after a relatively short period of time. To illustrate, the conventional paperboard ½ gallon juice carton will lose 60.5% of its essential oil (D-Limonene) and 84.5% of its Vitamin C content in a storage period of six weeks (SEE TABLE 1).

Figure 1:
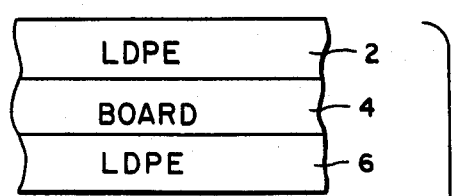
FIG. 1 is a cross-sectional elevation of an existing commercial structure of a laminate.
Figure 2:
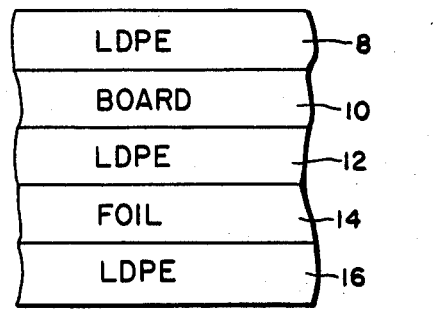
FIG. 2 is a cross-sectional elevation of an existing commercial structure of a laminate.

One conventional existing paperboard carton (FIG. 2) utilizes two additional layers in addition to the layers disclosed in FIG. 1 to add greater barrier resistance to the passage of oxygen and resultant loss of Vitamin C. Aluminum foil 14 has been added to the laminate structure to increase the barrier's resistance to the flow of oxygen. The additional layer of LDPE is needed to allow the laminate to be heat-sealed from front to back with the exterior LDPE 8 layer. The structure of the barrier laminate (FIG. 2) has poor barrier properties relating to the absorption of essential oils and aromas, since the heat-sealable contacting layer is still low density polyethylene. The shelf storage life of the juice carton made up of the barrier laminate of FIG. 2 still exhibits a percentage loss of essential oils (D-Limonene) of 35.5%, while greatly improving its barrier properties with respect to the percentage loss of Vitamin C, 24% (See Table 1). The addition of the foil layer allows the laminate to exhibit excellent $O_2$ barrier properties. Although, the use of a foil layer is extremely beneficial, the increased expense makes the use of foil economically less desirable.

Figure 3:
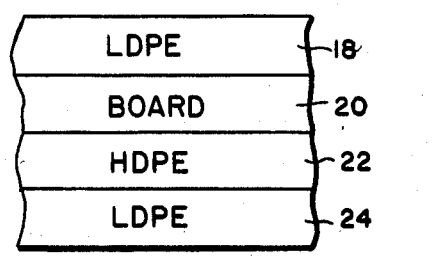
FIG. 3 is a cross-sectional elevation of an existing commercial structure of a laminate.
Figure 4:
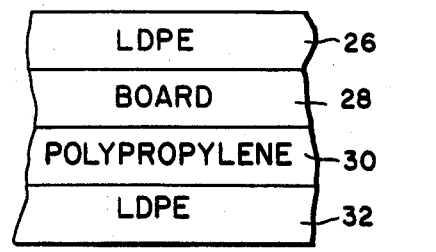
FIG. 4 is a cross-sectional elevation of an existing commercial structure of a laminate.

FIGS. 3 and 4 disclose structures of barrier laminates described in U.S. Pat. No. 4,513,036. FIG. 3 discloses a barrier laminate comprising a sandwich of LDPE 18-paperboard 20-High Density Polyethylene (HDPE) 22-LDPE 24. The laminate disclosed exhibits large losses of essential oils during its shelf life of six weeks, namely 60.5%, while also exhibiting large losses of Vitamin C during the six week period 87% (see Table 1). The economics and ease of fabrication of the laminates of FIG. 3 are outweighed by the poor barrier properties exhibited.

FIG. 4 discloses the preferred embodiment of U.S. Pat. No. 4,513,036, namely a barrier laminate comprising LDPE 26-Paperboard 28-Polypropylene 30-LDPE 32. The additional polypropylene layer 30 adds to the barrier properties at relatively low additional costs. The barrier properties still are extremely deficient in its resistance to the passage of oxygen and its loss of Vitamin C, namely 71% after six weeks. The polypropylene laminate structure loses 39.5% of its essential oils (D-Limonene) after six weeks (see Table 1).

Both embodiments disclosed in the patent cited above do not adequately preserve the aroma and Vitamin C content of the juice. The structure of the existing commercial constructions have all faced the same problem due to the necessity for heat sealing the seams and closures while forming the carton blank and while filling the cartons with juice or the like. The necessity of forming a heat seal from the front to the back of the laminate has resulted in the use of an exterior layer of LDPE and an interior layer of LDPE, both non-polar compounds which exhibit excellent heat-sealing characteristics to one another (see FIGS. 1-4).

Figure 5:
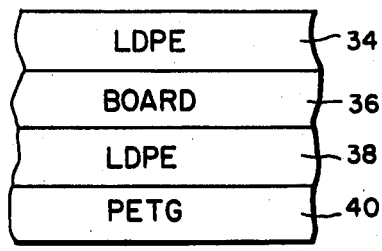
FIG. 5 is a cross-sectional elevation of the preferred embodiment of the laminate of the present invention.

Referring to FIG. 5, the preferred embodiment of the laminate of the present invention is shown as comprising a paperboard substrate 36 which is most suitably high-grade paperboard stock, for example, 282 lb. Milk Carton Board, to which is applied on both sides a coating of low density polyethylene (LDPE) 34, 38 in a coating weight ranging from about 5 to about 400 pounds per ream. Any commercial extrusion coating grade LDPE is suitable for use herein. On the back or interior portion of the laminate, namely onto LDPE layer 38 is applied a layer of PETG 40. The PETG being a heat-sealable layer composed of Kodak's KODABOND Copolyester 5116.

Figure 9:
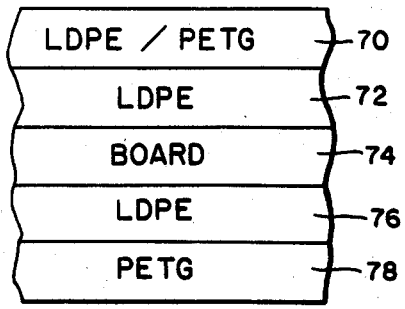
FIG. 9 is a cross-sectional elevation of an alternate embodiment of the laminate of the present invention.
Figure 10:
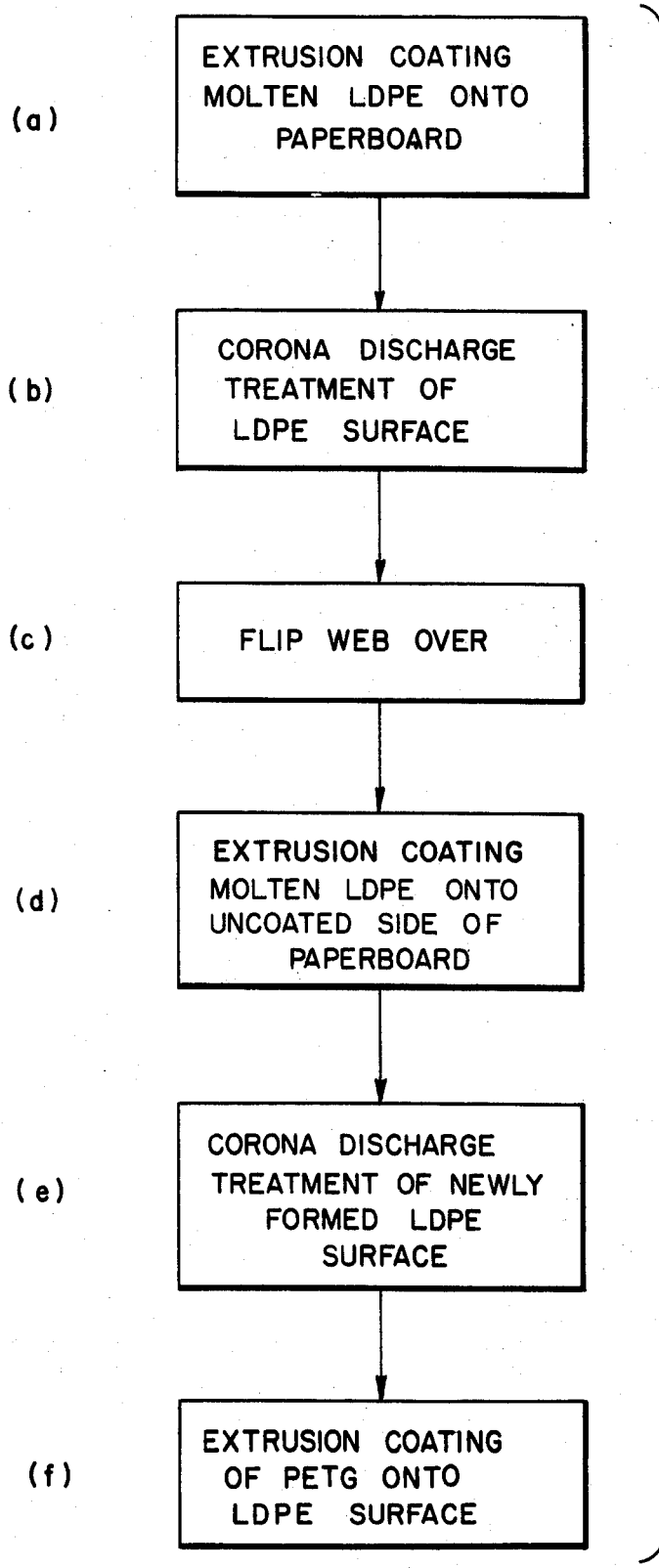
FIG. 10 is a block diagram representing the process for making the preferred embodiment of the laminate of the present invention.

Referring now to FIG. 9, wherein a block diagram discloses the method of forming the heat-sealable barrier laminate of FIG. 5.

The laminate can be easily fabricated. In Step A, a molten layer of the LDPE 34 is extrusion coated onto the paperboard substrate 36. Step B, the LDPE layer 34 is corona discharge or flame treated in preparation for subsequent heat-sealing Step C, the web is flipped over to facilitate Step D, which has a layer of molten LDPE 38 extrusion coated onto the paperboard substrate 36. Step E, LDPE layer 38 is corona discharge treated to facilitate the adhesion of a subsequent PETG coating, and lastly, Step D, a layer of PETG 40 is extrusion coated onto LDPE layer 38 to complete the sandwich.

Figure 6:
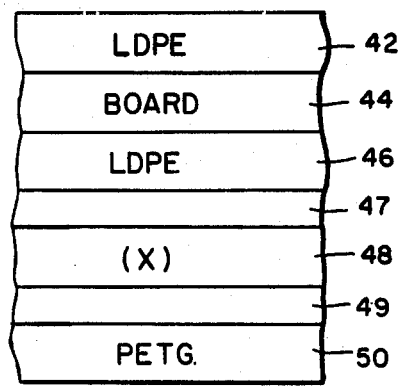
FIG. 6 is a cross-sectional elevation of an alternate embodiment of the laminate of the present invention.

Referring now to FIG. 6, an alternate embodiment of the laminate of the present invention is shown. The embodiment adds an additional barrier layer which not only provides total containment of flavor oils, but also provides significant containment of Vitamin C. In this alternate embodiment, the paperboard substrate 44 is coated on the external surface thereof with a web of heat-sealable LDPE 42. On the internal surface of the paperboard substrate 44 is applied a coating of LDPE 46. Overlying the LDPE web 46 is a layer of an oxygen barrier material 48. The oxygen barrier material can be any of the following group: foil, polyacrylonitrile, polyethylene terephthalate, polyvinylidene chloride, polyamide, polyethylene/vinyl alcohols or polyvinyl chloride. Overlying the barrier material is a layer of heat-sealable PETG 50 which will ultimately form the internal surface of the container constructed therefrom.

To enhance the adhesion of the additional barrier layer 48 to the LDPE layer 46 and the PETG layer 50, tie layers 47, 49 can be interposed therebetween. Adhesives which are extrudable or coextrudable, such as Dupont's C×A's or Norchem's PLEXARS, are suitable choices.

Figure 7:
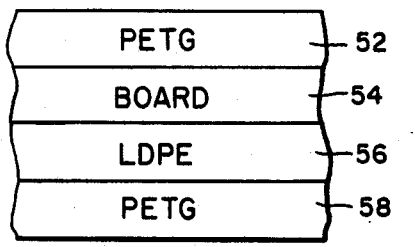
FIG. 7 is a cross-sectional elevation of an alternate embodiment of the laminate of the present invention.

FIG. 7 discloses another embodiment of the present invention. The embodiment replaces the exterior LDPE layer 34 of FIG. 5 with an exterior layer 52 of PETG extrusion coated onto the paperboard board substrate 54. The interior layers namely layer 56 (LDPE) and interior layer 58 (PETG) resemble the structure of FIG. 4. The addition of a heat-sealable layer of PETG on the exterior of the carton allows for numerous additional uses of the product. Such uses would be for packages requiring an enhanced oxygen barrier or ease of front to back sealing.

Figure 8:
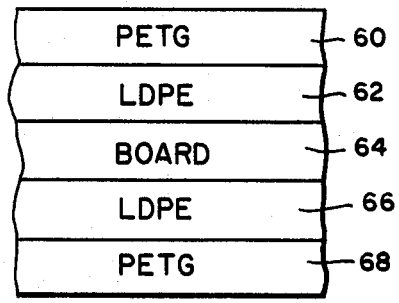
FIG. 8 is a cross-sectional elevation of an alternate embodiment of the laminate of the present invention.

FIG. 8 reflects a further embodiment of FIG. 7 wherein the laminate comprises from front to back: a layer of PETG 60, a layer of LDPE 62, the paperboard substrate 64, a layer of LDPE 66, and an innermost layer of PETG 68.

FIG. 9 reflects an embodiment similar to that of FIG. 8. Replacing the outer layer of a heat-sealable PETG 60, is a blend layer 70 of PETG and LDPE. The blend is made up of between five (5) to thirty (30) percent PETG and the rest being LDPE. The laminate is comprised from outside to inside: LDPE/PETG Blend 70-LDPE 72-PAPERBOARD SUBSTRATE 74-LDPE 76-PETG 78. The advantage of the LDPE/PETG blend layer is that it eliminates the need for surface treatment prior to heat sealing.

Although these specific coating techniques have been described, any appropriate technique for applying the layers onto the paperboard substrate can be suitably employed.

The unique barrier effect provided by the laminate of the present invention to the % loss of essential oils and to the % loss of Vitamin C is clearly demonstrated by the following example outlined in Table 1.

Standard ½ gallon juice containers were prepared and filled with juice. A typical essential oil in the juice was d-limonene. The filled cartons were stored for a test period of six weeks after which the juice was analyzed to determine the percentage loss by weight of the essential oil d-limonene and the percentage loss by weight of Vitamin C.

The six cartons tested were those shown in FIGS. 1–6 and described herein.

TABLE 1

| Test Sample ½ Gallon Juice Container | % Loss of Essential Oil | % Loss of Vitamin C |
|---|---|---|
| LDPE-BOARD-LDPE (FIG. 1) | 60.5 | 84 |
| LDPE-BOARD-LDPE-FOIL-LDPE (FIG. 2) | 35.5 | 24 |
| LDPE-BOARD-HDPE-LDPE (FIG. 3) | 60.5 | 87 |
| LDPE-BOARD-POLYPROPYLENE-LDPE (FIG. 4) | 39.5 | 71 |
| LDPE-BOARD-LDPE-PETG (FIG. 5) | 0* | 47 |
| LDPE-BOARD-LDPE-FOIL-PETG (FIG. 6) | 0* | 24 |

*Less than one percent

It can be clearly seen that the container prepared from a laminate of the present invention provides an almost complete barrier to the loss of essential oils far greater than has been present in existing structures comprising LDPE heat seal layers. Additionally, the oxygen passage or percentage loss of Vitamin C has been greatly reduced over all prior laminates not containing aluminum foil.

The effectiveness of the laminate of the present invention as a barrier to migration of essential oils and flavors, as well as a barrier to a loss of Vitamin C permits a significant extension of shelf life of containers constructed therefrom.

What is claimed is:

1. A container for liquids containing essential oils and/or flavors, said container constructed from a laminate comprising:
   (a) a paperboard substrate;
   (b) an outer layer of a heat-sealable low density polyethylene polymer coated on said outer surface of said paperboard substrate;
   (c) an inner layer of a heat-sealable low density polyethylene polymer coated on said inner surface of said paperboard substrate; and
   (d) a liquid contact layer of a heat-sealable glycol modified polyethylene terephthalate which can heat-seal with the outside layer of low density polyethylene of the laminate on conventional equipment at temperatures ranging from 250° F.–500° F. extrusion coated on said outer surface of said inner layer of said polyethylene polymer, acting as a barrier to the transport of oxygen and essential oils/flavors therethrough.

2. The container as claimed in claim 1 wherein said outer layer of a low density polyethylene polymer is corona discharge treated to enhance heat-sealability of said laminate.

3. The container as claimed in claim 1 wherein said outer layer of a low density polyethylene polymer is flame treated to enhance heat-sealability of said laminate.

4. The container as claimed in claim 2 wherein said surface of said inner layer of said heat-sealable low density polyethylene polymer is corona discharge treated to enhance adhesion of said heat-sealable PETG layer.

5. The container as claimed in claim 3 wherein said surface of said inner layer of said heat-sealable low-density polyethylene polymer is flame treated to enhance adhesion of said heat-sealable PETG layer.

6. The container as claimed in claim 1 wherein said laminate further comprises a layer of a heat-sealable glycol modified polyethylene terephthalate coated on said surface of said outer layer of said low density polyethylene polymer layer.

7. The container as claimed in claim 6 wherein said outer layer of low density polyethylene is corona discharge treated to enhance heat-sealability.

8. The container as claimed in claim 6 wherein said outer layer of a low density polyethylene is flame treated to enhance heat-sealability.

9. The container as claimed in claim 7 wherein said inner layer of a low density polyethylene is corona discharge treated to enhance adhesion to a subsequent coated heat-sealable PETG layer.

10. The container as claimed in claim 8 wherein said inner layer of a low density polyethylene is flame treated to enhance adhesion to a subsequent coated heat-sealable PETG layer.

11. A container for liquids containing essential oils and/or flavors constructed from a laminate comprising:
    (a) a paperboard substrate;
    (b) an outer layer of a heat-sealable low density polyethylene polymer coated on said outer surface of said paperboard substrate;
    (c) an inner layer of heat-sealable low density polyethylene polymer coated on said inner surface of said paperboard substrate;
    (d) an oxygen barrier material layer coated on said outer surface of said inner layer of said polyethylene polymer; and
    (e) a heat-sealable layer of glycol modified polyethylene terephthalate coated on said outer surface of said oxygen barrier material layer.

12. The container as claimed in claim 11 wherein said oxygen barrier material layer is a layer of aluminum foil.

13. The container as claimed in claim 11 wherein said oxygen barrier material layer is a layer of polyethylene terephthalate.

14. The container as claimed in claim 11 wherein said oxygen barrier material layer is a layer of polyvinylidene chloride.

15. The container as claimed in claim 11 wherein said oxygen barrier material layer is a layer of polyamide.

16. The container as claimed in claim 11 wherein said oxygen barrier material layer is a layer of polyethylene/vinyl alcohols.

17. The container as claimed in claim 11 wherein said outer layer of said low density polyethylene polymer is corona discharge treated to enhance heat-sealability of said laminate.

18. The container as claimed in claim 11 wherein said outer layer of said low density polyethylene polymer is flame treated to enhance heat-sealability of said laminate.

19. The container as claimed in claim 17 wherein said inner layer of said low-density polyethylene polymer is corona discharge treated to enhance adhesion of said subsequent heat-sealable PETG coating.

20. The container as claimed in claim 17 wherein said inner layer of said low-density polyethylene polymer is flame treated to enhance adhesion of said subsequent heat-sealable PETG coating.

21. A process for improving the resistance of paperboard to the migration of essential oils and/or flavorings, said process comprising the steps of:
    (a) extrusion coating an outer layer of a low density polyethylene polymer onto said outer surface of said paperboard;
    (b) corona discharge treating said outer layer of low density polyethylene polymer;
    (c) extrusion coating an inner layer of a low density polyethylene polymer onto said inner surface of said paperboard;
    (d) corona discharge treating said inner layer of low density polyethylene polymer; and
    (e) extrusion coating of a layer of a heat-sealable glycol-modified polyethylene terephthalate onto said surface of said inner layer of low density polyethylene polymer.

22. A process for improving the resistance of paperboard to the migration of essential oils and/or flavorings, said process comprising the steps of:
    (a) extrusion coating an outer layer of a low density polyethylene polymer onto said outer surface of said paperboard;
    (b) flame treating said outer layer of low density polyethylene polymer;
    (c) extrusion coating an inner layer of a low density polyethylene polymer onto said inner surface of said paperboard;
    (d) flame treating said inner layer of low density polyethylene polymer; and
    (e) extrusion coating a layer of heat-sealable glycol-modified polyethylene terephthalate onto said surface of said inner layer of low density polyethylene polymer.

* * * * *